US006862562B1

(12) United States Patent
Treiber et al.

(10) Patent No.: US 6,862,562 B1
(45) Date of Patent: Mar. 1, 2005

(54) COMPUTER METHOD AND APPARATUS FOR DETERMINING STATE OF PHYSICAL PROPERTIES IN A CHEMICAL PROCESS

(75) Inventors: Steven Treiber, Toronto (CA); Ashuraj Sirohi, North Andover, MA (US); Subhash Ghorpade, Houston, TX (US); Simon Lingard, Lexington, MA (US); Sundaram Ramanathan, Lexington, MA (US); Chau-Chyun Chen, Lexington, MA (US)

(73) Assignee: Aspen Technology, Inc., Cambridge, MA (US)

( * ) Notice: Subject to any disclaimer, the term of this patent is extended or adjusted under 35 U.S.C. 154(b) by 828 days.

(21) Appl. No.: 09/678,724

(22) Filed: Oct. 4, 2000

Related U.S. Application Data

(60) Provisional application No. 60/157,783, filed on Oct. 5, 1999.

(51) Int. Cl.[7] .............................. G06G 7/48; G06G 7/58
(52) U.S. Cl. ............................... 703/12; 703/6; 703/27; 700/28; 700/29; 700/30; 700/31
(58) Field of Search ............................... 703/12, 6, 27; 700/28, 29, 30, 31

(56) References Cited

U.S. PATENT DOCUMENTS

| 5,260,865 A | | 11/1993 | Beauford et al. ........... 364/151 |
| 5,402,333 A | * | 3/1995 | Cardner ....................... 700/31 |
| 5,687,090 A | * | 11/1997 | Chen et al. ..................... 703/6 |
| 5,933,345 A | | 8/1999 | Martin et al. ................ 364/164 |
| 6,093,211 A | * | 7/2000 | Hamielec et al. ............. 703/12 |

FOREIGN PATENT DOCUMENTS

WO    WO 99/14642    9/1998

OTHER PUBLICATIONS

Karjala, T.W. et al., "Real–Time Estimation of Polymer Properties in an Industrial Polyethylene Reactor," *Proceedings of the American Control Conference*, 5:3063–3067 (Jun. 1997).

Zhang, J. et al., "Prediction of Polymer Quality in Batch Polymerisation Reactors Using Neural Networks," *Proceedings of the American Control Conference*, 3:1370–1374 (Jun. 1997).

Sirohi, A. and K.Y. Choi, "Optimal Control of Transient Dynamics in a Continuous Polymerization Reactor," *Proceedings of the American Control Conference*, 2:1182–1186 (Jun. 1997).

McAuley, K.B. and J.F. MacGregor, "On–Line Inference of Polymer Properties in an Industrial Polyethylene Reactor," *AIChE Journal*, 37(6):825–835 (Jun. 1991).

Sirohi, A. and K.Y. Choi, "On–Line Parameter Estimation in a Continuous Polymerization Process," *Ind. Eng. Chem. Res.*, 35(4):1332–1343 (1996).

(List continued on next page.)

*Primary Examiner*—Anthony Knight
*Assistant Examiner*—Thomas Pham
(74) *Attorney, Agent, or Firm*—Hamilton, Brook, Smith & Reynolds, P.C.

(57) ABSTRACT

Computer method and apparatus determines state of physical properties, i.e. product quality, of a chemical manufacturing process. A steady state modeler provides a rigorous steady state model of the process and instantaneous state of physical properties. An estimator or inferential sensing member determines state of the physical properties over time based on the steady state (instantaneous) values of the physical properties. To that end, a dynamic model of the subject process is formed from the steady state model. The computer method and apparatus may be part of a network such that laboratory and sensor measured process data is made accessible by the steady state modeler and the estimator, and the estimator provides process parameter values for maintaining state of the physical properties. The network also enables online and user-interactive access to the steady state model, the dynamic model and/or the parameter values for enabling control of the subject process.

22 Claims, 1 Drawing Sheet

OTHER PUBLICATIONS

Zhang, H. and P.D. Roberts, "On–line steady–state optimisation of non–linear constrained processes with slow dynamics," *Transactions of the Institute of Measurement and Control:* 12(5), 1990.

Ansari, R.M. and M.O. Tadé, "Nonlinear model based multivariable control of a debutanizer," *J. Proc. Cont.:* 8(4), pp. 279–286, 1998.

Thomas, P.J. et al., "Steady state and dynamic simulation of multi–stage flash desalination plants: A case study," *Computers Chem. Engng.:* 22(10), pp. 1515–1529, 1998.

Jumar, U. et al., "Using on–line models to control wastewater treatment plants," *Automatisierungstechnik:* 46(5), pp. 235–236, 238, 240–244 (1988).

Glad, T. and L. Lung, *Reglerteknik (Automatic Control Engineering)*, Lund, Sweden: Studentlitteratur, 1981 (partial table of contents and pp. 188–189).

Schmidtbauer, B., *Reglerteknik (Automatic Control Engineering)*, Lindome (Gothenberg) Sweden, Kompendietryckeriet (Institute for Control at Chalmers University of Technology), 1984 (p. 97).

\* cited by examiner

COMPUTER METHOD AND APPARATUS FOR DETERMINING STATE OF PHYSICAL PROPERTIES IN A CHEMICAL PROCESS

RELATED APPLICATION

This application claims the benefit of Provisional Patent Application No. 60/157,783 filed Oct. 5, 1999, the entire teachings of which are incorporated herein by reference.

BACKGROUND OF THE INVENTION

Chemical processing plants are designed to carry out various complex, often non-linear, chemical processes, such as a polymer process. The processing plant design typically involves a series of various pieces of equipment, e.g., stirring tanks, evaporators, reactors, pumps, feed conduits and the like, and a control system for monitoring and maintaining settings of the various pieces of equipment to effect needed operating conditions (e.g., volume, flow rate, stirring rate, temperature, pressure, feed composition, etc.). Typically at the output end, the resulting product is analyzed in a laboratory for quality outcome. Product quality is commonly measured in terms of physical properties (or polymer properties), e.g., melt index, density, etc. Thus it is desired that these properties achieve certain values or value ranges, such that the product is termed "on spec".

In order to effect a change in physical properties and hence product quality, equipment settings, input and hence operating conditions are changed. To the extent that these changes are upstream in the chemical/polymer process, there is a time lag before a change in product quality/physical properties occurs and the full impact of the upstream changes is in effect. There is a further time lag from the time a product sample is taken at the output end of the process to the time the lab analysis with that sample is made. Thus it is desirable to have a means for predicting the downstream effect in product quality/physical properties for a given upstream change in operating condition. In the polymer processing industry, so-called "inferential sensors" or "soft sensors" are such predictive means.

By way of background, polymer processes are known to be highly non-linear. Polymer properties are complex, non-linear functions of polymer process plant operating conditions (process variables). Currently there are two methods of developing estimates of polymer properties such as melt index (MI) and density typically used for describing polymer product quality. The first method is a regression based inferential that uses neural networks, partial least squares (PLS), and other conventional regression methods. The second method employs State Estimation Models (SEM) which use an auto-calibrated (self-adjusting), non-linear, online rigorous dynamic model. Specifically, State Estimation Models provide a mass and energy balance model of the entire plant and thus involves equations for heat and mass balances, polymer thermodynamics and kinetics; Process geometries and control strategies.

The first method being a regression is only valid in the area where polymer property data has been collected in related areas of operation. Its advantage is that it is easy to use by plant engineers and is relatively inexpensive. One example implemented as a software tool is Aspen IQ™ by Aspen Technology, Inc. of Cambridge, Mass.

The second method is rigorous which means that it can extend its predictions beyond the range of data available. The advantage provided is that when new polymer products are made, for which there is no data, the probability of the model predicting correctly is higher for the rigorous method than for the regressed method. The disadvantage with the rigorous method is that it is difficult to implement and maintain with all its equations related to heat and mass balances, polymer thermodynamics, kinetics, process geometries and control strategies.

SUMMARY OF THE INVENTION

The non-linearity of polymer processes arises from several sources. First is the non-linearity introduced by the nature of the kinetic relationships governing polymerization and reactant concentrations. Second is the non-linearity introduced by changing residence time caused by changing density of the polymer in the reactor. Third is the non-linearity introduced by changing inventory in the reactor. Finally, the non-linearity introduced by changing production rates is another source of the non-linearity of polymer processes.

Polymers Plus is a polymer process modeling system manufactured by Aspen Technology, Inc. of Cambridge, Mass., assignee of the present invention. Together with Aspen Plus, Polymers Plus performs steady state polymer process calculations. Used in conjunction with an interface for online modeling (e.g. Aspen Online™ by Aspen Technology, Inc.), Polymers Plus enables the calculation of various steady state process performance parameters such as approach to dewpoint, superficial gas velocity, bed density and production rate, among others. The combination of Polymers Plus and Aspen Online is a software package called Polymers Plus Online by Aspen Technology, Inc. Polymers Plus Online is completely based on rigorous chemical engineering models.

Use of Polymers Plus handles the issue of non-linearities around kinetics and compositions. This handles the non-linearities associated with steady state behavior. The dynamic non-linearities are governed by the process geometry. Once that characteristic is identified it does not change but is merely scaled by changing residence time. Most polymer processes will exhibit some kind of low order transfer function behavior plus time delay. As the residence time changes, the time constant and delay change. Since all the factors that affect residence time are calculated by Polymers Plus Online, this scaling factor is able to be calculated at all times.

The preferred embodiment of the present invention expands on Polymers Plus Online to compute inferential estimates of polymer properties such as melt index and density. It provides a first principles inferential quality estimator that is based on the general purpose, proven, rigorous, easy to configure steady state polymer process simulator Polymers Plus. The steady state Polymers Plus model estimates the properties of the instantaneous polymers generated at any given time. Aspen IQ or Aspen Online provides the filter that integrates the changes in melt index, density and other properties for the accumulated polymers over time. The integrator time constant is updated each time based on the calculation of instantaneous residence time by Polymers Plus. The estimates of the polymer properties, such as melt index and density, then become a dynamic calculation based on a rigorous steady state model.

This approach takes advantage of unique characteristics of addition polymerization chemistries (such as free radical polymerization, ionic polymerization, and addition polymerization with Ziegler-Natta or metallocene type catalysts). In these systems, the polymer chains are formed in a relatively short time (fractions of seconds) compared to the residence time of the reactor (minutes and hours).

Thus, the present invention provides a method and apparatus for determining physical properties of a physical (chemical/polymer) process which addresses the problems of the prior art. In particular, the present invention provides computer apparatus for determining state of chemical/ polymer properties of a chemical/polymer process. The apparatus includes steady state modeling means for rigorously modeling the chemical/polymer process at steady state. Included in the rigorous steady state model are values for physical (e.g., polymer) properties of the chemical/ polymer process at steady state.

Coupled to the steady state modeling means is an inferential model means. The inferential model means receives the values of the physical (polymer) properties at steady state from the steady state modeling means and therefrom determines state of the physical properties over a period of time.

In a preferred embodiment, the physical (polymer) properties include melt index, density, tacticity, molecular weight distribution, xylene solubles, co-polymer composition and production weight. The steady state modeling means computes values of the physical (polymer) properties at steady state in terms of molecular weight distribution, and the inferential model means correlates melt index, density and other physical properties with molecular weight distribution. The steady state modeling means further calculates an instantaneous residence time of a reactor. In response, the inferential model means calculates cumulative values for the physical properties by mixing the values for the physical properties at steady state with previously calculated cumulative values of the physical properties over the residence time as last calculated by the steady state modeling means. As such the inferential modeling means utilizes a first or higher order dynamics of mixing analysis, with most recent values of the physical (polymer) properties at steady state provided by the steady state modeling means, to calculate cumulative values of the physical (polymer) properties.

In addition, the inferential model means may receive as input off line (laboratory) measured values of the physical (polymer) properties and adjust the determined state of the physical (polymer) properties based on the received off line measured values.

In accordance with another aspect of the present invention, the computer apparatus may be coupled to a process control subsystem. In that case, the inferential model means calculates and outputs values of parameters of the subject process, for maintaining the physical (polymer) properties at a user specified state (e.g., on spec). The process control subsystem receives from the inferential model means the output parameter values and controls the subject process according to the parameter values. The process control subsystem may include sensors for measuring physical conditions of the subject process, such as temperature, pressure, volume, feed composition and the like. The inferential model means in the preferred embodiment updates the sensor measurements.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
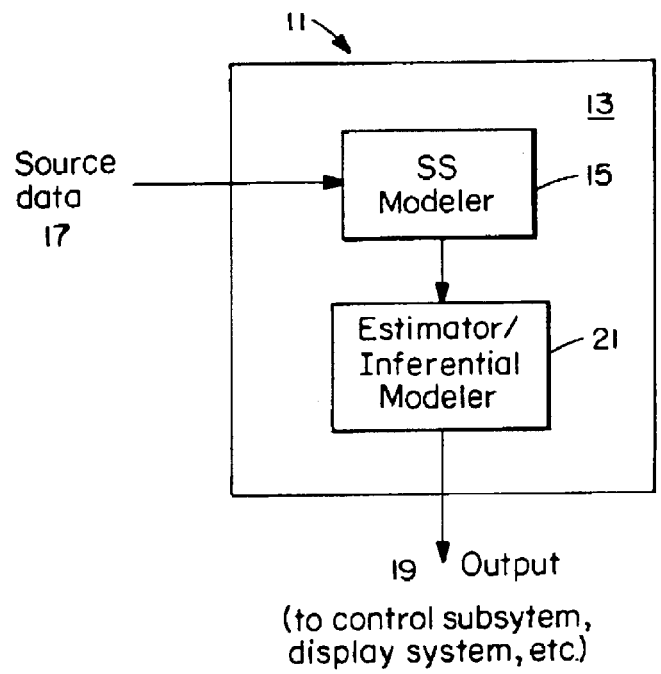
FIG. 1 is a schematic of a computer implementation of the present invention.

Illustrated in FIG. 1 is an overview of the present invention method and apparatus as implemented in a digital processor 13. The illustrated apparatus (and method) 11 for determining physical properties of a chemical/polymer process is basically formed of a steady state modeling member 15 and an inferential modeler 21. The steady state modeling member 15 provides a rigorous model of the entire chemical/polymer process and calculates the instantaneous or steady state properties of the chemical/polymer process products (e.g., polymers) at a given set of plant operating conditions.

The inferential modeler 21 estimates or predicts cumulative product properties over time given a set of steady state product property values, and hence is also termed an estimator or predictor. Inferential modeler 21 receives the instantaneous product properties calculated by the steady state modeling member 15 and therefrom determines the product properties over a period of time.

Accordingly, as illustrated in FIG. 1, the invention apparatus and method 11 receives indications of a subject plant operating conditions, as source data 17, from a database, another digital processor, a computer program/routine or similar source. In response to source data 17, steady state modeling member 15 calculates the instantaneous (steady state) product properties at the certain time of the operating conditions as indicated by the source data 17, where the subject chemical/polymer process is rigorously modeled by steady state modeling member 15. Using the instantaneous product property values as calculated by the steady state modeling member 15, the inferential modeler 21 determines state of the product properties over time, and outputs 19 quantitative indications of the determined state (product property values over time). To that end, the present invention method and apparatus 11 dynamically calculates estimations of product (physical) properties based on a rigorous steady state model of the subject chemical/polymer process.

Output 19 may be to a display subsystem (e.g., screen views on a monitor, hard copy via printer, etc.), a controller system, another digital processor or program/routine, and the like. In the case of output 19 being forwarded to a control subsystem of the subject processing plant, the output quantitative indications 19 include parameter values for maintaining the product property values at a user specified state. The control subsystem, in response to the parameter values 19, accordingly sets plant operating conditions (temperature, pressure, composition, etc.) via volume, flow rate, heater and other settings.

In the preferred embodiment, steady state modeling member 15 is a software program, computer tool or other similar digital processing means for simulating a desired physical (i.e., chemical or polymer) process. One example is Polymers Plus by Aspen Technology, Inc. of Cambridge, Mass. (assignee of the present invention). With respect to polymer process modeling, Polymers Plus includes polymer component characterization (including molecular weight distribution), calculation of physical properties and phase equilibria, polymerization kinetics and calculation of polymer product properties.

In particular, Polymers Plus uses a segment approach to characterize polymers as described in U.S. Pat.

No. 5,687,090 herein incorporated by reference. The polymer is described as composed of a number of structural units called segments. This approach provides a flexible and consistent framework for tracking structural properties via segments in conjunction with other molecular structure attributes. In addition, a methodology is available for predicting molecular weight distribution for polymers produced via a chain growth kinetics model. Molecular weight distribution is tracked throughout a process flow sheet in every process stream as described in U.S. Pat. No. 6,093,211, incorporated herein by reference.

With respect to the calculation of physical properties, Polymers Plus calculates physical properties and phase equilibria of polymer-monomer mixtures. This includes:

(i) activity coefficient models of the Flory-Huggins, polymer NRTL, UNIFAC and UNIFAC Free-Volume types;

(ii) equations-of-state using Sanchez-Lacombe, polymer Soave-Redlich-Kwong, and Statistical Associating Fluid theories;

(iii) models for molar volume, heat capacity, heat of formation, enthalpy, viscosity, Tg, Tm; and (iv) physical property data banks for polymers, monomers, segments and functional groups.

With respect to polymerization kinetics, Polymers Plus provides a comprehensive set of kinetic schemes for the major polymerization chemistries. The kinetics are decoupled from the reactors. This makes it possible to apply a single reaction scheme to multiple reactors or to apply combinations of reaction schemes to any reactor.

Lastly Polymers Plus calculates and tracks polymer product properties such as density, melt index and intrinsic viscosity. User correlations are able to be incorporated to track end-use properties throughout a process simulation.

Given the foregoing, Polymers Plus enables a wide range of industrial polymerization processes to be modeled from step-growth polymerization, to free-radical polymerization, ionic polymerization and others. In the step-growth polymerization model, various polycondensation and specialty plastic processes are able to be described/simulated. This model accounts for any combination of monofunctional and bi-functional linear monomers, generates all possible reactions from the species functional group definition and provides the flexibility for incorporating user reactions for cyclic and multi-functional monomers. Applications include polyethelene terephthalate (PET), polybutylene terephthalate (PBT), polycarbonates (PC) and polyamides.

The free-radical polymerization model provides a comprehensive kinetic scheme for the bulk or solution free radical homo- and co-polymerization of one or more monomers. Applications include polystyrene (PS), Styrene-Acrylonitrile (SAN), Polymethylmethacrylate (PMMA), and low density polyethylene (LDPE).

A free-radical emulsion polymerization model in Polymers Plus is applicable to processes where nucleation occurs by micellar and homogeneous nucleation mechanisms. The underlying kinetics are similar to those in the free-radical model discussed above. Applications include Styrene butadiene rubber (SBR), polyvinylacetate, and polyacrylates.

An addition polymerization with Ziegler-Natta and metallocene catalysts model enables modeling of a variety of stereospecific multi-site and single-site catalyzed addition polymerization systems. Such systems include the traditional Ziegler-Natta catalyzed systems, chromium-based catalyzed systems and the more recent metallocene-based catalyzed systems. Applications include high density polyethylene (HDPE), linear low-density polyethylene (LLDPE), polypropylene (PP), and Ethylenepropylenediene monomer polymer (EPDM).

An ionic polymerization model in Polymers Plus is applicable to anionic, cationic and group transfer polymerization schemes. Applications include polystyrene (PS), polyethylene oxide (PEO), polypropylene oxide (PPO), styrene butadiene rubber (SBR).

In addition, Polymers Plus may be coupled with Aspen Plus and Aspen Custom Modeler both of Aspen Technology, Inc. of Cambridge, Mass. to provide further simulation capabilities. These include an extensive set of unit operation models, robust convergence algorithms, plant parameter estimation capabilities and an open architecture for user customization.

Returning to FIG. 1, the preferred inferential modeler 21 is a software program/routine, computer tool or similar model-based digital processor means for making estimates or predictions about product quality in a manufacturing process. One example is Aspen IQ by Aspen Technology, Inc. of Cambridge, Mass. (assignee of the present invention). A base line version of Aspen IQ includes three modules called the IQ model, IQ predict and IQ update. The IQ model provides the user with the means to develop linear partial least squares (PLS), nonlinear-fuzzy PLS and hybrid neural network models. A host of data analysis and conditioning tools allow the user to import data and then generate steady state or dynamic empirical models. The inferential model development techniques are further described in U.S. Pat. Nos. 5,666,297 and 6,041,263 and application Ser. No. 09/160,128, herein incorporated by reference. Data alignment and process dynamics determination of IQ model are able to use either a genetic algorithmic or single input/output approach. Variable selection is performed by the use of genetic algorithms. Sensor validation models may also be produced such as that described in U.S. patent application Ser. Nos. 09/179,343 and 09/474,630, herein incorporated by reference.

The generation of an inferential sensor value itself is performed in the IQ predictor module. Inferentials based on linear combinations, polynomial, linearized rigorous modeling, as well as user-specified models (with no practical limit to the number of terms) are supported. Input may be dynamically compensated before the inferential prediction is performed. One common approach is to build an "analyzer predictor". The analyzer predictor uses dynamic models and generates steady state and dynamic predictions of the analyzer. Linear PLS models generated from IQ model and linearized rigorous models generated elsewhere may be executed by IQ predict.

Online analyzers are frequently used in closed loop control strategies and as an update source for inferentials with varying degrees of success. Problems such as spikes, frozen signals, drift, infrequent cycle time and long process delays can reduce the effectiveness of the control strategy. IQ predict is designed specifically to validate the raw analyzer signals to determine if it is suitable for use in an inferential sensor or control strategy. After the analyzer signal is validated, it may be used to update the inferential sensor.

Another feature of the IQ predict module is the steady state detector. The purpose of the steady state detector is to quantify how close the unit is to steady state. The user may specify a number of major process variables and the steady-state percentage is calculated for each variable. These inputs are combined to produce an overall unit steady state percentage.

In most cases, even the best inferential sensor will drift away from the laboratory calculated values if no corrective measures are taken. IQ update monitors and validates the laboratory values and if necessary applies an update to the result generated in IQ predict. Before a laboratory value can be used to update an inferential, it must first be validated. The lab value is screened for outliers (values outside of predetermined thresholds) and checked against minimum and maximum values. The steady state detector percentage at the time the sample was taken may also be used to validate the lab value.

After the laboratory value has been validated, a bias update is calculated as the offset between the inferential sensor prediction and the laboratory value. This offset, or bias, is applied to the current inferential value to ensure that the inferential sensor tracks the laboratory. Three bias update schemes are supported by IQ update including a CUSUM, a scoring and a traditional approach. The amount of the calculated bias that is actually applied and the speed at which it is filtered to the online system are some of the end-user tunable parameters.

If an online analyzer is available, then the validated signal from IQ predict may be used, instead of the laboratory value, to update the bias. In this case, the laboratory value is monitored and an analyzer drift is calculated. If the drift exceeds its operator-entered limit, then a message is generated and the bias update source is automatically switched from analyzer to laboratory values.

One of the most important aspects of inferential development is to ensure that accurate time stamps are available for the laboratory data used in the data gathering. If these time stamps are not accurate, then the processed data will not be properly synchronized to the laboratory value. This can lead to the development of poor fitting models and inappropriate laboratory updates. IQ update is designed to ensure that the time stamps are as accurate as possible.

Figure 2:
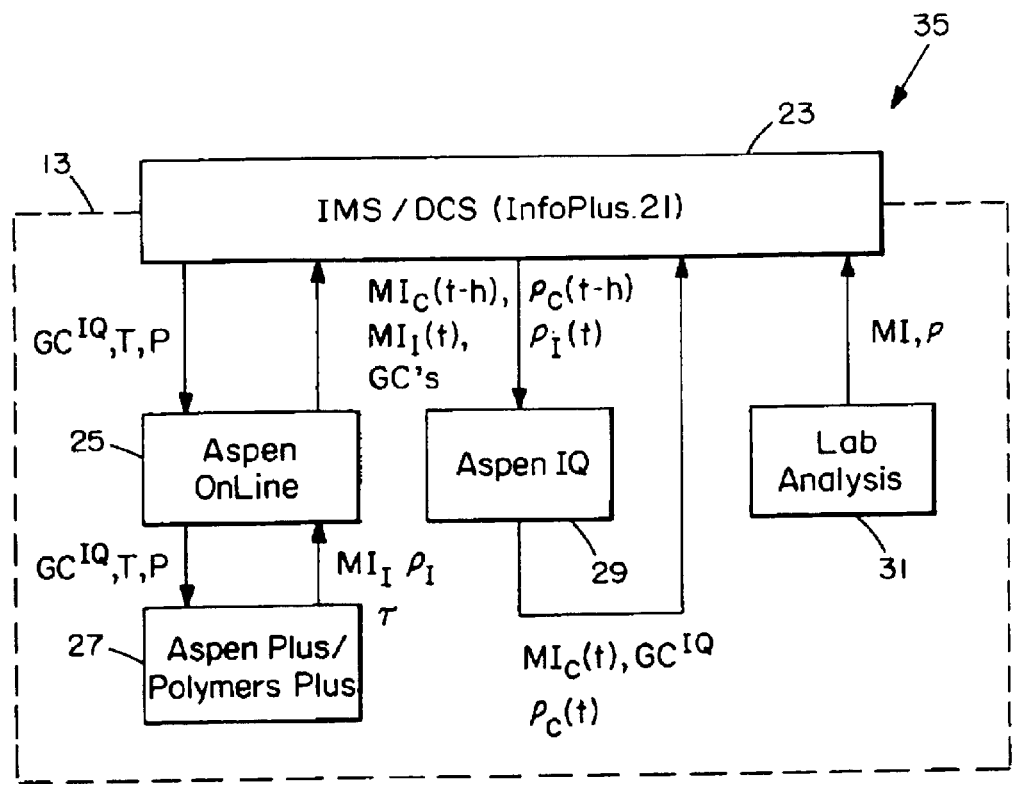
FIG. 2 is a block diagram of the preferred embodiment.

Turning now to FIG. 2 is a block diagram of the preferred embodiment. The preferred embodiment makes use of existing Aspen Technology, Inc. (of Cambridge, Mass.) software products as the building blocks. These products include Aspen Plus® and Polymers Plus 27, Aspen Online 25 and Aspen IQ 29. The use of Aspen Plus, Aspen Online and Polymers Plus form the commercially known Polymers Plus Online. Polymers Plus Online 25, 27 computes instantaneous polymer properties in terms of molecular weight distribution. Aspen IQ 29 is used to correlate the polymer properties of melt index and density with molecular weight distribution and also provides the laboratory analyzer, an update facility, as previously described. Aspen IQ 29 also provides the filter which is required to integrate the changes in melt index, density and other properties based on the Polymers Plus Online 25, 27 calculation. The integrator time constant is updated each time based on the calculation of instantaneous residence time by Polymers Plus 27. The estimates of the properties such as melt index and density then become dynamic calculations based on a rigorous steady state model.

Specifically, the preferred embodiment utilizes Aspen Online 25 to connect the Aspen Plus/Polymers Plus 27 steady state model of a subject chemical/polymer process to Aspen IQ 29 via a plant information (database) system 23. In the preferred embodiment, the plant information database system is a plant-wide operations information, data monitoring and analysis system with a relational database that stores each variable of the subject processing plant. The illustrated database system 23 is, for example, InfoPlus .21 by Aspen Technology, Inc. of Cambridge, Mass.

Aspen Online 25 is an interface for online modeling and as such establishes communications and controls the flow of information between plant data sources and process models. Aspen Online 25 also enables the analyzing and validating of plant data and model results. Accordingly, Aspen Online 25 connects the Aspen Plus/Polymers Plus 27 steady state model online and schedules Aspen Plus/Polymers Plus 27 simulations. Plant conditions measured online by gas composition, temperature and pressure sensors, etc. are validated by Aspen IQ 29 and used by Aspen Plus/Polymers Plus 27 models to calculate the properties of the instantaneous polymer at the current plant operating conditions. Aspen IQ 29 is also used to perform additional algebraic calculations such as the calculation of cumulative properties by mixing the instantaneous properties with previously calculated cumulative properties over the residence time of the plant reactor. The final polymer properties are a result of the instantaneous polymer mixed with the bulk polymer over the residence time of the reactor. Furthermore, Aspen IQ 29 handles the laboratory samples 31 and the results are used to calibrate the final product property predictions.

FIG. 2 shows the system configuration of the preferred embodiment. Plant operating conditions (such as gas composition, temperature, pressure, etc.) are stored on the plant information database system 23 of the manufacturing plant and are passed down to the Aspen Plus/Polymer Plus 27 model through Aspen Online 25. Gas composition measurements being so critical to the application are validated by Aspen IQ 29 and then stored in database system 23 for subsequent use by modelers 27. Aspen Plus/Polymers Plus 27 performs a steady state run calculating the instantaneous polymer properties, especially melt index ($MI_i$), and density ($\rho_i$) and the reactor residence time ($\tau$). These steady state values of melt index, density and residence time are stored in the plant information database system 23. Aspen IQ 29 reads these values from the database 23 and performs the calculation of the cumulative properties using an analytical expression of the first order dynamics of mixing. The expressions take the form (Equations I):

$$MI_C^{-0.286}(t) = \exp(-h/\tau) MI_C^{-0.286}(t-h) + \{1 - \exp(-h/\tau)\} MI_I^{-0.286}(t-h)$$

$$1/\rho_C(t) = \exp(-h/\tau)/\rho_C(t-h) + \{1 - \exp(-h/\tau)\}/\rho_I(t-h)$$

Where $MI_C(t)$, $\rho_C(t)$ are the cumulative properties of melt index and density, respectively, at the current time, t. $MI_C(t-h)$, $\rho_C(t-h)$ are the cumulative properties at the previous simulation time; $MI_I(t-h)$, $\rho_I(t-h)$ are the instantaneous (steady state) properties calculated in the previous simulation, h is the time interval and $\tau$ is the reactor residence time. The instantaneous properties at the previous simulation time are used because the latest instantaneous properties do not impact the cumulative properties. However, when the preferred embodiment 35 is implemented using the Aspen Plus/Polymers Plus/Aspen Online 25, 27 approach, the instantaneous properties correspond to conditions immediately before the model was run. Although these conditions can be minutes old, the present invention uses the latest conditions available. To that end the form of Equations I employed by the present invention is (Equations II):

$$MI_C^{-0.286}(t) = \exp(-h/\tau) MI_C^{-0.286}(t-h) + \{1 - \exp(-h/\tau)\} MI_I^{-0.286}(t)$$

$$1/\rho_C(t) = \exp(-h/\tau)/\rho_C(t-h) + \{1 - \exp(-h/\tau)\}/\rho_I(t)$$

Aspen IQ 29 also reads laboratory measurements 31 for melt index and density and calculates the model prediction error in the form of a bias term ($MI_C^{bias}$, $\rho_C^{bias}$) using established Aspen IQ 29 techniques. This bias term is used to correct the predicted melt index and density ($MI_C^P$, $\rho_C^P$) according to the relationship $$MI_C = MI_C^P + MI_C^{bias}$$
$$\rho_C = \rho_C^P + \rho_C^{bias}$$

As the gas composition measurements are used directly by the Aspen Plus/Polymers Plus 27 model and are therefore critical to the effectiveness of the sensor, Aspen IQ 29 is also used to validate the gas composition. This feature detects any unusual or missing gas composition measurements and substitutes an appropriate value.

The Aspen Plus/Polymers Plus 27 model takes several seconds to several minutes to run. Gas composition measurements are available every few minutes. Temperature measurements are available continuously. Thus, the preferred embodiment 35 schedules Aspen IQ 29 and the model to run every one to five minutes such that the effect of temperature on instantaneous properties is captured between gas composition measurements.

While this invention has been particularly shown and described with references to preferred embodiments thereof, it will be understood by those skilled in the art that various changes in form and details may be made therein without departing from the scope of the invention encompassed by the appended claims.

For example, an alternative is to integrate Polymers Plus 27 directly with Aspen IQ 29. In such a combination local polymer property and kinetic models are developed within Aspen IQ 29. The calculations within this Aspen IQ 29/Polymers Plus 27 approach are instantaneous whereas execution of Aspen Plus/Polymers Plus 27 via Aspen Online 25 described above in FIG. 2 may be longer. Therefore, this alternative implementation is applicable to both fast as well as slow polymer processes.

In another example, as an extension of the present invention, is the use of the inferred dynamic model (i.e., the dynamic product properties based on steady state modeling) to calculate an optimum operating point for the purpose of controlling the manufacturing process to an economic optimization objective.

What is claimed is:

1. Computer apparatus for determining state of physical properties of a chemical process:
   steady state modeling means for rigorously modeling a chemical process at steady state, the chemical process including physical properties, said steady state modeling means providing values for the physical properties at steady state based on a rigorous model of the chemical process; and
   an inferential model means coupled to receive the values of the physical properties at steady state from the steady state modeling means, the inferential model means for determining state of the physical properties over a period of time based on values of the physical properties at steady state.

2. Computer apparatus as claimed in claim 1 wherein the physical properties include melt index, density, tacticity, molecular weight distribution, xylene solubles, copolymer composition and production weight.

3. Computer apparatus as claimed in claim 1 wherein the inferential model means utilizes a first order dynamics of mixing analysis with most recent values of the physical properties at steady state provided by the steady state modeling means, to calculate cumulative values of the physical properties.

4. Computer apparatus as claimed in claim 1 wherein the inferential model means further receives as input, off-line measured values of the physical properties and adjusts the determined state of the physical properties based on the received off-line measured values of the physical properties.

5. Computer apparatus as claimed in claim 1 wherein the inferential model means calculates and outputs values of parameters, of the chemical process, for maintaining the physical properties at a user specified state; and
   the apparatus further comprises a process control subsystem coupled to receive the parameter values output from the inferential model means, such that the process control subsystem controls the chemical process according to the parameter values.

6. Computer apparatus as claimed in claim 2 wherein the steady state modeling means computes values of the physical properties in terms of molecular weight distribution, and
   the inferential model means correlates at least melt index and density with molecular weight distribution.

7. Computer apparatus as claimed in claim 2 wherein the steady state modeling means further calculates an instantaneous residence time of a reactor in the chemical process; and
   the inferential model means calculates cumulative values for the physical properties by mixing the values of the physical properties at steady state, including at least melt index and density, with previously calculated cumulative values of the physical properties over the residence time as last calculated by the steady state modeling means.

8. Computer apparatus as claimed in claim 5 wherein the process control subsystem includes sensors measuring physical conditions of the chemical process; and
   the inferential model means updates sensor measurements.

9. A method for determining state of physical properties of a chemical process, comprising the computer implemented steps of:
   rigorously modeling a subject chemical process at steady state, including modeling physical properties of the chemical process at steady state, said modeling providing instantaneous physical property values for a given time, indicative of respective physical properties at steady state; and
   based on the instantaneous physical property values, inferentially modeling the subject chemical process using a first order dynamics of mixing analysis, thereby estimating state of the physical properties over a period of time such that estimates of the physical properties are dynamically calculated based on the instantaneous physical property values for a given time provided by the rigorous steady state modeling.

10. A method as claimed in claim 9 wherein the physical properties include melt index, density, tacticity, molecular weight distribution, xylene solubles, co-polymer composition and production weight.

11. A method as claimed in claim 9 further comprising the step of receiving offline measured values of the physical properties and adjusting the estimated state of the physical properties based on the received off-line measured values.

12. A method as claimed in claim 9 further comprising the step of calculating values of parameters of the subject chemical process for maintaining the physical properties at a user specified state.

13. A method as claimed in claim 10 wherein the step of modeling includes computing values of the physical properties in terms of molecular weight distribution; and
   the step of estimating includes correlating at least melt index and density with molecular weight distribution.

14. A method as claimed in claim 10 wherein the step of modeling includes calculating an instantaneous residence time of a reactor in the subject chemical process; and the step of estimating includes calculating cumulative values for the physical properties by mixing the instantaneous physical property values with previously calculated cumulative values of the physical properties over the residence time as last calculated by the modeling step.

15. A method as claimed in claim 12 further comprising the step of updating sensor measurements of physical conditions of the subject chemical process.

16. Computer apparatus for process control, comprising:
a steady state modeler for modeling a subject process including physical properties at steady-state, the steady-state modeler providing a steady state model of the subject process, including values of physical properties at steady state;
an inferential sensing member coupled to the steady state modeler for determining state of physical properties over a period of time, such that a dynamic model of the subject process is formed from the steady state model, including the values of physical properties at steady state, the inferential sensing member further providing parameter values for maintaining physical properties at a user specified state in the subject process to effect control of the process; and
a network communication assembly coupled to the steady state modeler and the inferential sensing member enabling online and user-interactive access to at least one of the steady state model, the dynamic model and parameter values, for enabling control of the subject process.

17. Computer apparatus as claimed in claim 16 wherein the subject process is a chemical process, or polymer process, or physical process carried out in a processing plant.

18. Computer apparatus as claimed in claim 16 wherein the steady state modeler computes instantaneous state of the physical properties of the subject process in terms of molecular weight distribution; and
the inferential sensing member includes an integrator for correlating certain physical properties with molecular weight distribution and updating sensor measurements of other physical properties, said integrator integrating changes in the certain physical properties based on the steady state modeler computed instantaneous states of the physical properties.

19. Computer apparatus as claimed in claim 17 wherein the parameter values are usable for defining state of equipment forming the processing plant.

20. Computer apparatus as claimed in claim 18 wherein the certain physical properties include melt index, density, tacticity, molecular weight distribution, xylene solubles, co-polymer composition and production weight.

21. Computer apparatus for process control, comprising:
a steady state modeler for modeling a subject process including physical properties at steady-state, the steady-state modeler providing a steady state model of the subject process;
an inferential sensing member coupled to the steady state modeler for determining state of physical properties over a period of time, such that a dynamic model of the subject process is formed from the steady state model, the inferential sensing member further providing parameter values for maintaining physical properties at a user specified state in the subject process to effect control of the process; and
a network communication assembly coupled to the steady state modeler and the inferential sensing member enabling online and user-interactive access to at least one of the steady state model, the dynamic model and parameter values, for enabling control of the subject process,
wherein the steady state modeler computes instantaneous state of the physical properties of the subject process in terms of molecular weight distribution; and
the inferential sensing member includes an integrator for correlating certain physical properties with molecular weight distribution and updating sensor measurements of other physical properties, said integrator integrating changes in the certain physical properties based on the steady state modeler computed instantaneous states of the physical properties.

22. Computer apparatus as claimed in claim 21 wherein the certain physical properties include melt index, density, tacticity, molecular weight distribution, xylene solubles, co-polymer composition and production weight.

* * * * *